J. E. DUAIME.
TRACTOR.
APPLICATION FILED OCT. 15, 1915.
1,302,023.
Patented Apr. 29, 1919.
4 SHEETS—SHEET 4.
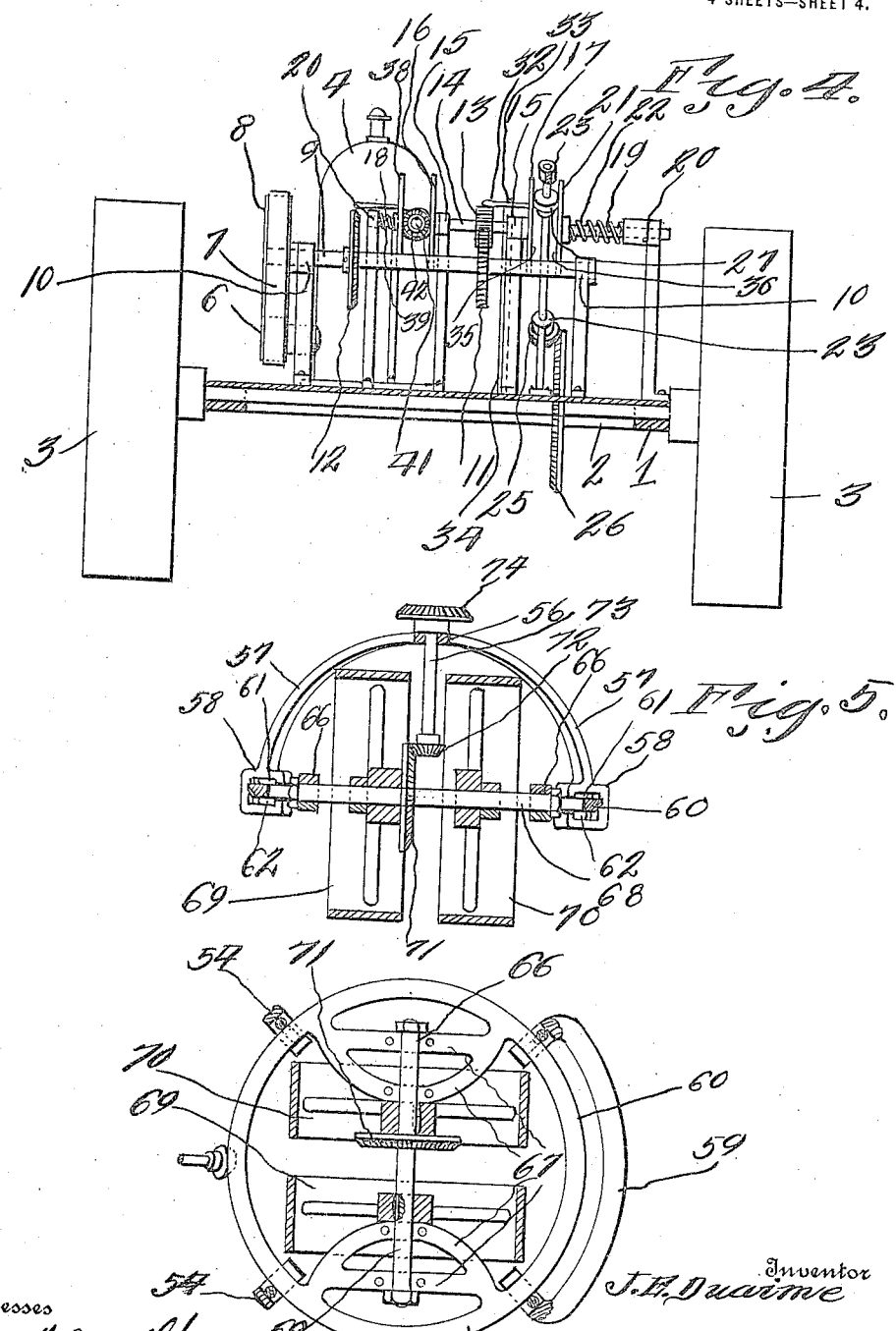

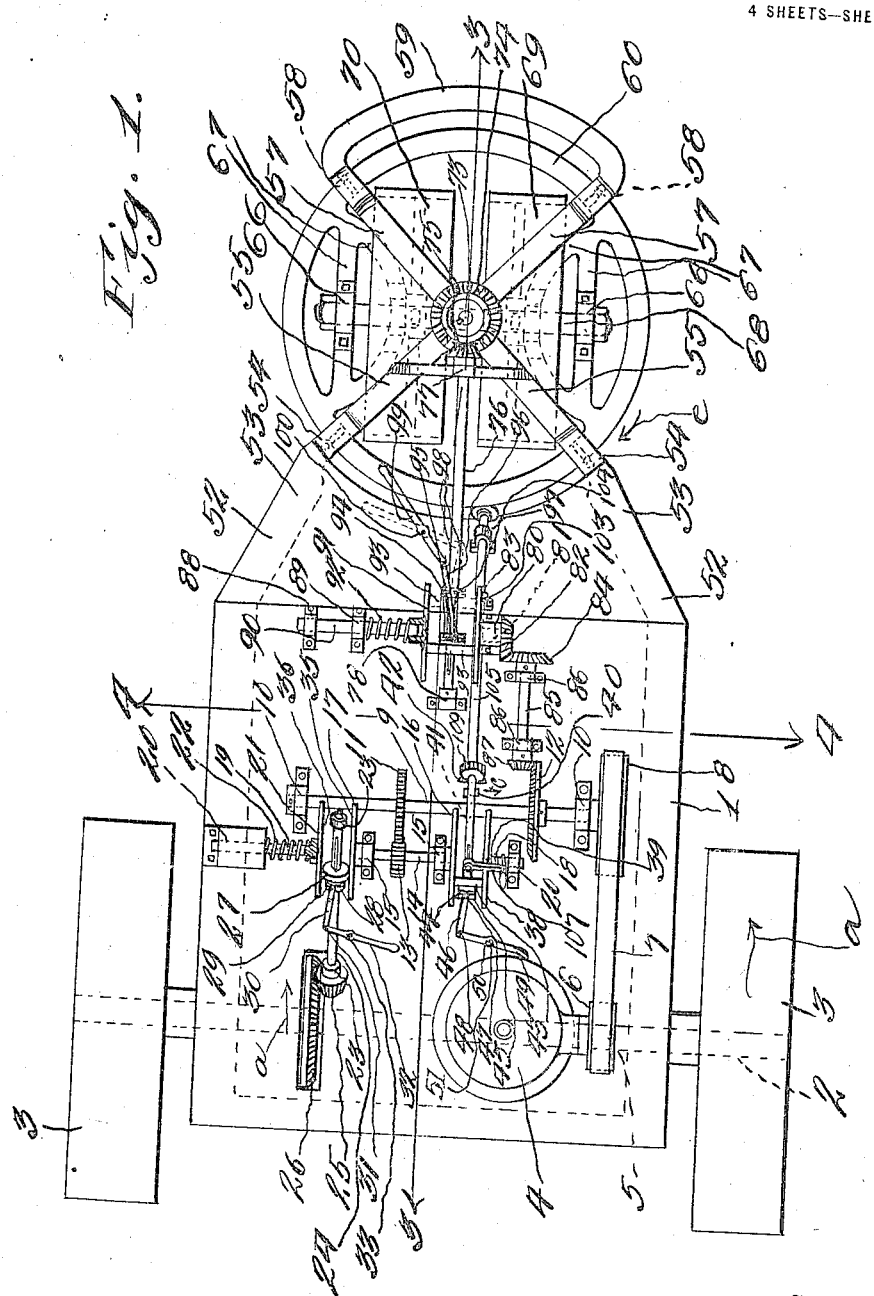

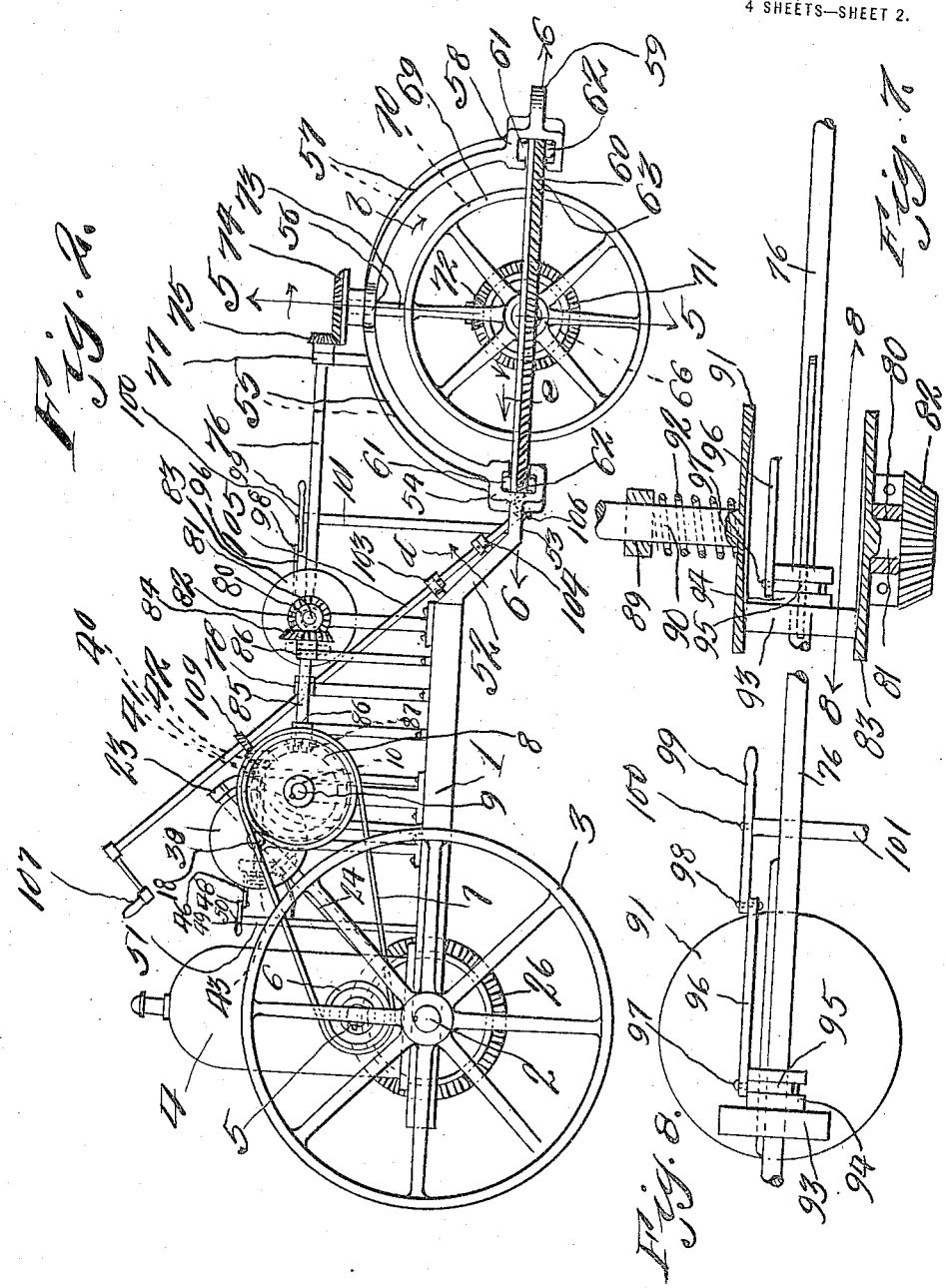

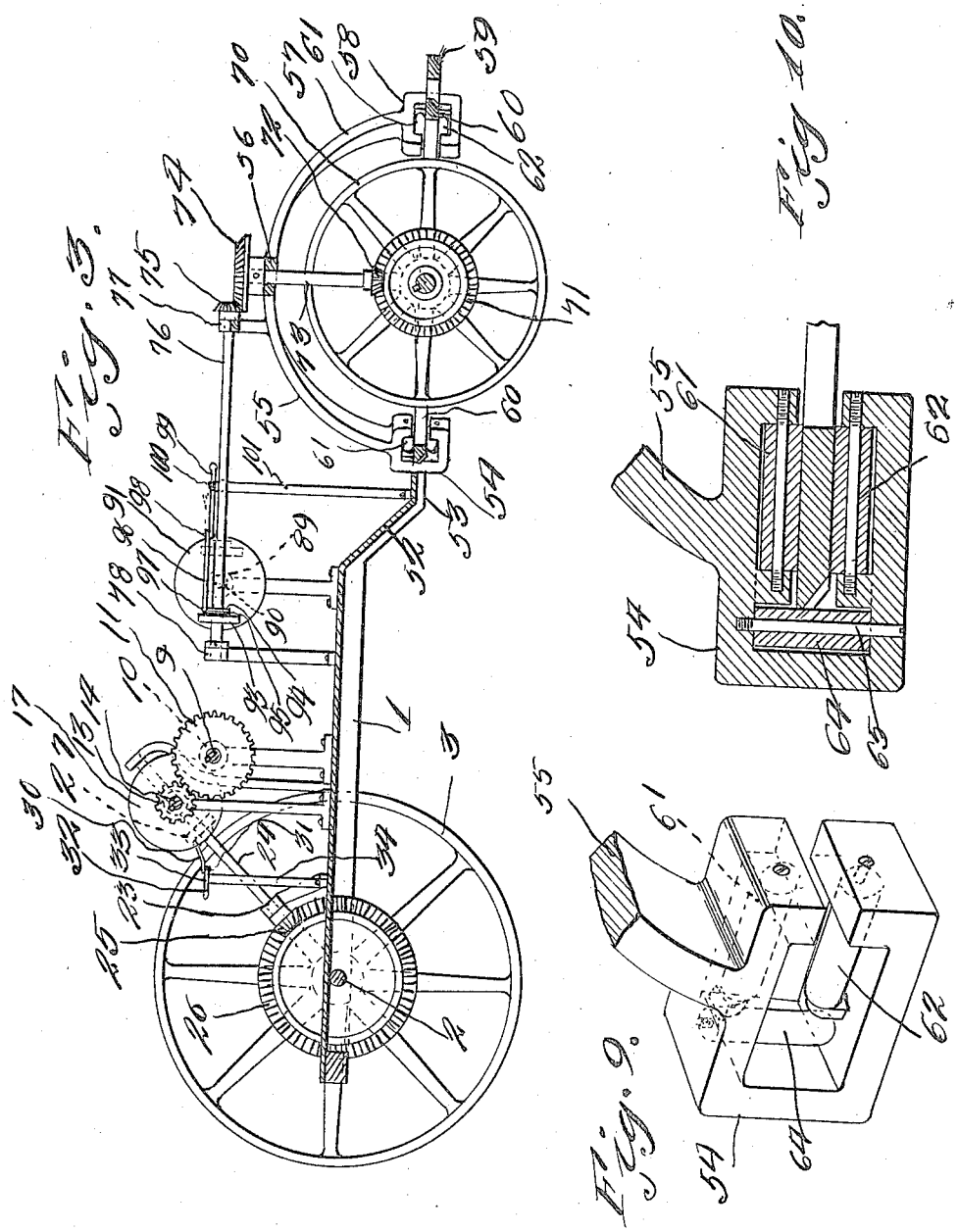

UNITED STATES PATENT OFFICE.

JOSEPH E. DUAIME, OF WEST DE PERE, WISCONSIN.

TRACTOR.

1,302,023.

Specification of Letters Patent. Patented Apr. 29, 1919.

Application filed October 15, 1915. Serial No. 56,046.

*To all whom it may concern:*

Be it known that I, JOSEPH E. DUAIME, a citizen of the United States, residing at West De Pere, in the county of Brown, State of Wisconsin, have invented a new and useful Tractor; and I do hereby declare the following to be a full, clear, and exact description of the invention, such as will enable others skilled in the art to which it appertains to make and use the same.

This invention relates to an improved tractor, for drawing threshing machines and the like, or for drawing gang plows.

One of the objects of the invention is to provide an improved tractor involving efficient, simple and practical features of construction.

One of the features of construction is the provision of means for driving either the forward or rear wheels of the tractor, or the forward and rear wheels at the same time, for moving the machine forward. For instance, if the rear wheels become stuck, then the forward wheels may be set in motion to assist in imparting movement to the machine, or if the rear wheels slip, the forward wheels may be used to assist the rear wheels in moving the machine and vice versa.

Another feature of the invention is the provision of a steering mechanism, which may be manipulated by hand, or by the motive power.

In practical fields the details of construction may necessitate alterations, falling within the scope of what is claimed.

The invention comprises further features and combination of parts, as hereinafter set forth, shown in the drawings and claimed.

In the drawings:

Figure 1 is a plan view of the improved tractor constructed in accordance with the invention.

Fig. 2 is a view in side elevation.

Fig. 3 is a longitudinal view on line 3—3 of Fig. 1.

Fig. 4 is a transverse sectional view on line 4—4 of Fig. 1.

Fig. 5 is a sectional view on line 5—5 of Fig. 2.

Fig. 6 is a sectional view on line 6—6 of Fig. 2.

Fig. 7 is a detail view of a frictional drive between a driven stub shaft and a shaft which is geared to the front wheels.

Fig. 8 is a sectional view on line 8—8 of Fig. 7.

Fig. 9 is a detail view of a bearing of the forward part of the frame, showing the anti-frictional roller bearings for a partial rotatable annular steering.

Fig. 10 is a sectional view through the bearing shown in Fig. 9.

Referring more especially to the drawings, 1 designates a frame, in bearings of which a drive axle 2 is mounted, on which supporting traction wheels 3 are rotated. Supported upon the frame 1 is the usual form of gas engine 4, the driven shaft 5 of which is provided with a pulley 6 having belt connections 7 with the pulley 8 of the shaft 9. The shaft 9 is mounted in suitable bearings 10 of the frame, and is provided with a gear 11, and a beveled gear 12. The gear 11 meshes with the pinion 13, which is carried rotatably with the shaft 14, mounted in the bearings 15, and on the ends of the shaft 14 are friction concaved disks 16 and 17. Axially alined with the shaft 14 are the shafts 18 and 19 mounted in the bearings 20. Loose upon one end of the shaft 19 is a friction disk 21, between which and the bearing 20 a coil spring 22 is interposed, which spring acts to hold the disk 21 toward the disk 17. Mounted in a bearing 23 of the frame is an angularly extending shaft 24, the lower end of which has a beveled pinion 25 meshing with the beveled gear 26 on the drive shaft 2. Keyed to slide but rotate upon the shaft 24 is a friction wheel or member 27 having a grooved collar 28, and arranged in the groove of the collar 28 is an annular ring 29, which may be constructed in two parts, as shown, so as to be arranged in the groove of said collar. One end of a link 30 is pivotally connected to a lateral pin of a ring 29, while the other end of the link 30 is pivoted at 31 to one end of the lever 32, which is fulcrumed at 33 upon a post or standard 34 of the frame 1. The friction member or wheel 27 coöperates between the adjacent concaved friction surfaces 35 and 36 of the disks 17 and 21; therefore it is to be noted that when the member 27 is in the position shown in Fig. 1, and the shaft 14 is being rotated through the medium of the shaft 9 and its belt connection with the engine 4, motion is transmitted to the beveled gear 26, thereby rotating the drive shaft 2 and its traction wheels 3 in the direction of the arrow *a*. It will be observed that when the member 27 is shifted toward and between the centers of the concaved friction surfaces of the disks 17 and 21, the member 27 will remain idle, in other words, will not rotate. However, if the friction wheel or member 27 is shifted upon the friction surfaces on the other side of the axial centers of the friction disks 17 and 21, the drive shaft 2 and its traction wheels will be rotated in the opposite directions. The coil spring 22 constitutes means to hold the friction disk 21 toward and against the friction member or wheel 27. Upon one end of the shaft 18 so as to slide thereon is a friction disk 38, there being a coil spring 39 between the disk 38 and the bearing 20 of the shaft 18. Mounted in bearings 40 of the frame 1 and extending between the disks is a shaft 41 having a beveled gear 42 at one end, and a friction member or wheel 43 keyed to slide but rotate near the other end. The friction member or wheel 43 also has a grooved collar 44 in the groove of which an annular ring 45 is arranged. This ring 45 is constructed in two parts, so as to be fitted in the groove. One end of a link 46 is pivoted to a lateral pin 47 of the ring, while the other end of the link 46 is pivoted at 48 to one end of the lever 49, which is pivoted at 50 to a standard or post 51 of a frame. The frame 1 substantially midway between its ends is deflected downwardly as shown at 52, then partially forward as shown at 53, then merging into the U-shaped bearings 54. Rising and curving upwardly from the bearings 54, and extending toward each other are the bars or arms 55, which merge into a bearing 56. Extending from the bearing 56 and curving forwardly and downwardly and diverging are the bars or arms 57, the lower forward ends of which terminate in U-shaped bearings 58. The bearings 58 are connected integrally by the curved bar 59, which arches the beveled gear 60 concentrically, to protect the gear against contacting with an obstruction or the like. The U-shaped bearings 54 and 58 are provided with horizontal upper and lower anti-frictional roller bearings 61 and 62, on which the beveled gear 60 freely rotates. The beveled gear 60 has a rib to engage the lower roller bearing 62, in order to prevent the teeth of the beveled gear 60 from contacting with the roller bearings 62. The U-shaped bearings 54 and 58 are provided with vertical roller bearings 64 journaled upon the pin 65, and are designed to engage the peripheral edge of the beveled gear 60, thereby permitting it to rotate freely and at the same time hold the beveled gear properly centered and in position. Mounted in suitable bearings 66 of inwardly projecting parts 67 of the beveled gear 60 is a transverse axle or shaft 68, on which the forward traction wheels 69 and 70 are keyed.

Also keyed to the shaft 68 is a beveled gear 71, with which the pinion 72 meshes, which pinion 72 is carried by and rotatable with the shaft 73 mounted in the bearing 56. On the upper end of the shaft 73 a beveled gear 74 is fixed, and which gear 74 meshes with the pinion 75, which is carried by the shaft 76, which is mounted in the bearings 77 and 78. The bearing 77 is carried by the arms or bars 55, while the bearing 78 is carried by the frame 1. In a bearing 80 of the frame 1 a stub shaft 81 is mounted, one end having a beveled gear 82, the other end having a friction disk 83. The beveled gear 82 meshes with a beveled gear 84 on the shaft 85, which is mounted in the bearing 86 of the frame 1. The other end of the shaft 85 has a beveled gear 87 meshing with the beveled gear 12 of the shaft 9. Therefore it is to be noted that owing to power being transmitted to the shaft 9 by means of the belt 7, motion is transmitted to the friction disk 83, by virtue of the gears 82, 84 and 87. Mounted in the bearings 88 and 89 of the frame 1 is a shaft 90, loosely and slidably upon one end of which is a friction disk 91, spaced apart from and axially alined with the disk 83, there being a coil spring 92 for holding the disk 91 toward and against the friction member or wheel 93, which is interposed between the two disks 83 and 91, and is keyed slidably but rotatably upon the shaft 76. This friction member or wheel 93 is provided with a grooved collar 94, the groove of which receives the two part ring 95, to a lateral pin of which one end of the link 96 is pivoted at 97. The other end of the link 96 is pivoted at 98 to the lever 99, which is fulcrumed at 100 on the standard or post 101. The shafts 81 and 90 are axially alined, and as shown in Fig. 1 the friction member or wheel 93 is in a position to the left of the axial centers of the disks 83 and 91, so that when power is transmitted to the disk 83 by virtue of the gears 84, 87 and 12, the front traction wheels 69 and 70 will be rotated in the direction of the arrow $b$, owing to the gear connections between the axle 68 and the shaft 76, thereby moving the machine forwardly. When the friction member or wheel 93 is to the right of the axial centers of the friction disks 83 and 91, the forward traction wheels will be rotated in an opposite direction, thereby backing the machine. However, when the friction wheel or member 93 is directly between and contacting with the axial centers of the disks 83 and 91, power will not be transmitted to the shaft 76, in which case the forward wheels 69 and 70 will not affect either the forward or backward motion of the machine, in which instance the propulsion of the machine is left to the rear traction wheels. Mounted in bearings 103 and 104 of the angular part 52 of the frame 1 is an angularly extending shaft 105, the lower forward end of which has a pinion 106 meshing with the teeth of the beveled gear 60. The rear upper end of the shaft 105 has a crank 107, by the manipulation of which the shaft 105 is rotated, which in turn through the gear 106 rotates the gear 60 partially in one direction or the other, for steering the machine to the right or the left. On the shaft 105 is a pinion 109 meshing with the beveled gear 42. When the friction wheel or member 43 is upon the left side of the axial centers of the disks 16 and 38, and coöperating with their adjacent concaved friction surfaces, the shaft 41 is rotated in the direction of the arrow $c$, thereby rotating the shaft 105 in the direction of the arrow $d$, which in turn through the gear 106 will partially rotate the gear 60 in the direction of the arrow $e$, so that the machine will turn to the right. Just so soon as the machine is turned to the right sufficiently, the friction wheel or member 43 must then be shifted to coöperate with the axial centers of the disks 16 and 38, in which case the gear 60 will remain in the position it has been rotated. Then after the machine has made the proper turn, the friction member or wheel must be shifted to the right of the axial centers of the disks 16 and 38, and held in such position until the gear 60 is rotated partially sufficiently to bring the front traction wheels straight again, then the friction member or wheel 43 may be shifted back in coöperation with the axial centers of the disks 16 and 38, until it is again desired that the machine should be turned to the right or the left automatically by the motive power from the shaft 9. As long as the friction member or wheel 43 remains in coöperation with the axial centers of the friction disks 16 and 38, the shaft 105 may be rotated by the crank 107, for steering the machine.

The invention having been set forth, what is claimed as new and useful is:—

In a machine as set forth, a frame having rear supporting wheels and provided with a forward arch portion, said arch portion being formed from two arching members having their rear ends integral with the side sills of the frame and their forward ends connected by an integral brace, said connection of the rear ends and the forward ends preventing the springing or bending of the arching portions when the tractor is in movement over rough ground, one of each of the rear and forward ends of the arch portions being on either side of the longitudinal center line of the tractor, said rear and forward ends being provided with U-shaped brackets which house anti-frictional rollers and vertically disposed side thrust rollers, a horizontally arranged gear mounted in said anti-frictional rollers, a shaft mounted in bearings of the horizontal gear, wheels on said shaft and means meshing with the horizontal gear for pivotally rotating the same for steering the tractor.

In testimony whereof I have signed my name to this specification in the presence of two subscribing witnesses.

JOSEPH E. DUAIME.

Witnesses:
 ELI BOUGIE,
 JAMES BOUGIE.

Copies of this patent may be obtained for five cents each, by addressing the "Commissioner of Patents, Washington, D. C."